United States Patent Office 3,432,413
Patented Mar. 11, 1969

3,432,413
METHOD FOR CARRYING OUT CHEMICAL REACTIONS USING MICROWAVE ENERGY
John W. Vanderhoff, Midland, Mich., assignor to The Dow Chemical Company, Midland, Mich., a corporation of Delaware
No Drawing. Filed Nov. 2, 1964, Ser. No. 408,347
U.S. Cl. 204—159.22                     11 Claims
Int. Cl. C08f 1/16; C08d 1/12, 1/02

---

ABSTRACT OF THE DISCLOSURE

A method for conducting chemical reactions in two-component systems comprising an inert diluent and a reactive component capable of reacting with itself is provided by subjecting a mixture of the reactive component and the diluent, in which the diluent has a polarity differing from that of the reactive component, to pulsed electromagnetic radiation on the radio-frequency to microwave range, said electromagnetic radiation having a potential capable of causing dielectric heating, the pulse duration and frequency being adjusted to avoid thermal activation; the method being particularly useful for the polymerization of vinyl monomers.

---

DISCLOSURE

The present invention relates to a novel method for initiating and conducting chemical reactions and more particularly to a method for carrying out chemical reactions using electromagnetic radiation.

It is well known that high energy ionizing radiation, such as X-rays, electron beams from betatrons, cyclotrons, and other high energy electron sources or radiation from radioactive elements, such as Cobalt 60, can cause chemical reactions. These reactions occur as a result of ionization induced in the reagents irradiated, and require energy on the order of several electron volts. At the much lower radio-frequencies and in the microwave range the energy of electromagnetic radiation is much too low to produce ionization and hence the chemical reactions that are obtained with ionizing radiation cannot generally be obtained with electromagnetic radiation in the radio-frequency and microwave range. Electromagnetic radiation in these frequency ranges, however, has been employed to create a heating effect in dielectric subjects irradiated, e.g., dielectric heating and diathermy. The thermal effect caused by electromagnetic radiation in the radio-frequency and microwave range has also been utilized in chemical reactions which are activated by heating. In particular, the setting of adhesives or the curing of certain resin compositions may be accomplished through the dielectric heat caused by electromagnetic irradiation in this frequency range.

It is an object of the present invention to provide a novel method of initiating and conducting chemical reactions. It is a further object of the present invention to provide a novel method of conducting chemical reactions which employ non-ionizing electromagnetic radiation. It is yet another object of the present invention to provide a method for initiating chemical reactions in which non-ionizing electromagnetic radiation in the radio-frequency and microwave range is employed in the absence of significant thermal effects. It is still another object of the present invention to polymerize vinyl monomers using electromagnetic radiation in the radio-frequency and microwave range. Other objects will become apparent hereinafter.

In accordance with the present invention it was discovered that chemical reaction can be initiated and carried out by subjecting a two-component system comprising an inert diluent and a reactive component in which the diluent has a polarity differing from that of the reactive component, to pulsed electromagnetic radiation in the radio-frequency to microwave range, said electromagnetic radiation having a potential capable of causing dielectric heating, the pulse duration and frequency being adjusted to avoid significant thermal effects. In a preferred embodiment of the present invention such electromagnetic radiation is employed in the polymerization of vinyl monomers.

Although the mechanism which results in the initiation of the polymerization of the vinyl monomer is not clearly understood, experimental evidence indicates the need for a two-component environment in order for the electromagnetic radiation in the radio-frequency and microwave range to initiate the polymerization of the vinyl monomer. Thus, in addition to the vinyl monomer, there must be present a second component which is inert with respect to the monomer and the polymerization, and which has a polarity different from that of the vinyl monomer. Thus, the vinyl monomer is irradiated either in solution or in the form of a dispersion in an inert medium having a different polarity from that of the vinyl monomer. The medium in which the monomer is polymerized appears to have no significant effect on the polymerization reaction per se, but is apparently necessary to allow the pulsed non-ionizing electromagnetic radiation employed to initiate the polymerization. It is in general preferred to employ the vinyl monomer in the form of a dispersion or emulsion since the electromagnetic radiation appears to be most effective at conditions at which there is a liquid/liquid interface between the vinyl monomer and its surrounding environment. It is not essential that the vinyl monomer constitute the dispersed phase and inverted dispersions or emulsions may be similarly employed. Although it is preferred to employ a liquid monomer dispersed in a liquid medium, the process of the present invention is also applicable to interfacial systems involving a liquid monomer and a solid medium or a liquid medium and a gaseous monomer. The ratio of medium to monomer in the two-component system to be irradiated is not critical and the ratio can vary from 1:20 to 20:1, although it is in general preferred to employ the two components in more equal ratios such as 1:5 to 5:1.

As indicated hereinabove, one of the critical features of the process of the present invention is the pulsing of the electromagnetic radiation through the reaction mixture. The principal reason for pulsing the electromagnetic radiation is, of course, to avoid substantial heating of the reaction mixture and to prevent undesirable thermal effects. Any arrangement of pulse duration and pulse repetition frequency which allows for the dissipation of any adverse heat build-up in the reaction mixture is suitable. Thus, the pulse duration may be varied from one to 100 microseconds and pulse repetition frequency from four to 1,000 pulses per second. The actual irradiation time of the reaction mixture to the electromagnetic radiation in any given period of time is called the duty cycle and is calculated by multiplying the pulse duration by the pulse repetition frequency, and is generally reported as the percentage of the overall exposure time. For most reaction mixtures, the duty cycle will vary from 0.001 to 1%. The frequency of the electromagnetic radiation encompasses the radio-frequency and the microwave range and generally varies from 5 to 1,000 megacycles per second although for most reaction mixtures a frequency between 5 and 50 megacycles per second is sufficient to initiate the reaction. The potential necessary to initiate the reaction will differ depending on the distance between the electrodes and the nature of the composition irradiated. In general, the potential is such that under continuous radiation dielectric heating would result and is at least 100 volts/cm. Preferably the voltage will be from 300 to about 10,000 volts/cm., depending on the size of the electrodes, the quantity of the two-component system irradiated, and the nature of the two-component system. Although higher voltages facilitate the initiation of the reaction, the thermal effect caused by the electromagnetic radiation becomes more pronounced at higher voltages. Optimum conditions for the initiation of any particular reaction are most preferably obtained experimentally by adjusting the duty cycle, the frequency, and the voltage.

The means necessary to carry out the process of the present invention are generally known to those skilled in the art. Thus radio-frequency generators operating in the above-indicated frequencies and supplying the necessary voltage potentials are available in the industry. The oscillators employed to obtain the pulsing of the electromagnetic radiation are similarly well known. In general, the process of the present invention is carried out by placing the system to be exposed between the two electrodes and in contact with such electrodes, one of the electrodes being grounded and the other connected to the radiation generator. The electrodes are preferably made of a noble metal, such as platinum or silver. The pulsing of the electromagnetic radiation is generally continued until the desired degree of reaction is obtained, or until no further reaction occurs, and hence is best established experimentally for each particular system employed. The method of conducting chemical reactions by the use of the described electromagnetic radiation may be employed in batch processes as well as in continuous proceses. It is particularly suitable in continuous processes where once the reaction has been initiated, it is capable of self-propagation such as in polymerization. Although the reactions are generally carried out at room temperature, it is posible to employ elevated temperatures, if desirable.

Although the process of the present invention is described herein more specifically in terms of vinyl polymerizations, it is to be understood that the process is also suitable for other reactions using the stated conditions. In general, the reactions which are capable of being initiated by the use of electromagnetic radiation, as described hereinabove, are intra- and inter-molecular reactions involving the same or similar species, such as isomerization reactions and addition-polymerization reactions. The process of the present invention is of particular utility in addition-polymerizations of vinyl monomers. As indicated hereinabove, the polymerization is carried out in the presence of a second component which has as different polarity from that of the reagent, e.g., the vinyl monomer. Although the medium may contain a monomer in dissovled form, it is preferable to employ a medium in which the monomer exists as a separate phase, e.g., in the form of a dispersion or emulsion. Hence, the process of the present invention is particularly suitable for the polymerization of vinyl monomers which are known to be polymerizable by emulsion or suspension techniques heretofore developed. In effect, the electromagnetic radiation replaces chemical catalysts heretofore employed in such polymerizations. Such suspension or emulsion polymerization techniques generally employ an aqueous medium in which the monomer is either dispersed by means of agitation, i.e., suspension polymerization, or by means of an emulsifying agent, i.e., emulsion polymerization. The presence or absence of the emulsifying agent and the nature of the emulsifying agent do not appear to affect the ability of the electromagnetic radiation to initiate the polymerization. Monomers which are particularly suitable for use in emulsion or suspension polymerization include styrene, butadiene, isoprene, chloroprene, acrylic esters, such as methyl methacrylate and ethyl acrylate, and vinyl halides, such as vinyl chloride and vinylidene chloride. The polymerization of gaseous monomers such as ethylene or propylene or tetrafluoroethylene may also be accomplished through the use of electromagnetic radiation by passing a stream of the monomer through a liquid non-solvent maintained between the electrodes.

The process of the present invention was also found to cause the polymerization of water soluble vinyl monomers in aqueous solutions. Such water soluble monomers include unsaturated acids and particularly acrylic and methacrylic acid as well as such vinyl monomers as acrolein and vinyl acetate.

Although it is well known that emulsion polymerization results in substantially higher polymerization rates than are obtained either in solution polymerization or in bulk polymerization, the polymerization rates obtained by the use of pulsed electromagnetic radiation are substantially higher than even those obtained in emulsion polymerization and hence represent a significant advance in the art of emulsion or suspension polymerization.

The process of the present invention is further illustrated by the following examples, which, however, are not to be construed as being limitative of the invention described.

Example 1

An oil-in-water emulsion was prepared by admixing one part of inhibitor-free styrene with two parts of water containing 2% of a cationic surface active agent, e.g., commercially available Aerosol C–61. The emulsion was placed in a glass cell between two circular platinum electrodes contacting the emulsion, spaced 2 cm. apart. Using a radio-frequency generator capable of operating over a frequency range of 5 to 50 mc./sec. with a voltage capable of being varied from 0 to 20,000 volts peak-to-peak/cm., the emulsion was irradiated at 36 mc./sec. using a pulse duration of 4 microseconds and a pulse repetition frequency of 200 pulses per second. The initial voltage output was 800 volts peak-to-peak/cm. After a total exposure time of 21 minutes, the emulsion was converted into a polystyrene latex which could be precipitated by pouring into methanol. A polymer yield of 20–25% was obtained. Infrared spectra of the precipitate indicated the polymer to be polystyrene containing a trace of carbonyl groups. Electron microscopy of the irradiated emulsion showed the presence of latex particles. The fact that despite the duty cycle of 0.08%, or an actual irradiation time of 1.0 second, a yield of 20–25% was obtained is indicative of an extremely rapid rate of initiation.

Example 2

Employing the equipment of Example 1 an emulsion of 1 part of styrene and 2 parts of water containing 0.4% of the emulsifying agent of Example 1 was irradiated at 36 mc./sec. for a period of five minutes using a pulse duration of 25 microseconds and a pulse repetition frequency of 200 pulses per second. The voltage applied was 400 to 500 volts/cm. The overall irradiation time was 5 minutes and the actual irradiation time 1.5 seconds. The emulsion was converted to a polystyrene latex.

Example 3

Employing the equipment of Example 1, a styrene emulsion containing one part of styrene and 4 parts of a 2% aqueous solution of the emulsifying agent of Example 1 was irradiated at a frequency of 22 mc./sec. for a period of about 10 minutes using a pulse duration of 8 microseconds and a pulse repetition frequency of 10 pulses/sec., and a voltage of 800 volts/cm. With a duty cycle of 0.08%, the actual irradiation time was therefore 0.48 second. A polystyrene latex was obtained.

Example 4

Employing the equipment of Example 1, a n-butyl acrylate emulsion containing one part of n-butyl acrylate and 4 parts of a 2% aqueous solution of the emulsifying agent of Example 1 was irradiated at a frequency of 36 mc./sec. for a period of about 2 minutes using a pulse duration of 8 microseconds and a pulse repetition frequency of 200 pulses per second at a voltage of about 800 volts/cm. A poly-n-butyl acrylate latex was obtained.

Example 5

Using the equipment of Example 1, a 20% aqueous solution of acrylic acid was irradiated at a frequency of 22 mc./sec. for about 3 minutes, employing a pulse duration of 20 microseconds and a pulse repetition frequency of 200 pulses per second. The applied voltage was 450 volts/cm. An aqueous solution of polyacrylic acid was obtained.

Example 6

Using the equipment of Example 1, a 20% aqueous solution of methacrylic acid was irradiated at a frequency of 22 and 27 mc./sec. for a period of about 3 minutes, using a pulse duration of 20 microseconds and a pulse repetition frequency of 200 pulses per second at an applied voltage of 450 volts/cm. A solution of polymethacrylic acid was obtained.

The foregoing examples have illustrated the effectiveness of pulsed electromagnetic radiation to initiate the polymerization of vinyl monomer in a two-component system. In view of the substantially similar behavior of other vinyl monomers when polymerized in the described two-component systems by prior art methods, it will be apparent that the process of the present invention is equally applicable to the other monomers hereinabove set forth, employing the specific techniques illustrated in the examples. Since the mechanism by which the polymerization of vinyl monomers is initiated is applicable to other reactions, it will also be apparent that the process of the present invention is applicable to such reactions, and it is intended to include such reactions within the scope of the present invention. Various embodiments and preferred methods of carrying out the process of the present invention will be apparent to those skilled in the art and are encompassed within the scope of the novel electromagnetic radiation process herein described.

The utility of the process of the present invention is believed to be apparent from the foregoing description and examples. Of particular value is the rapid initiation of the reaction when the reagents are subjected to pulsed electromagnetic radiation. As compared to reactions initiated by high energy ionizing radiation, the process of the present invention provides a method for conducting chemical reaction with radiation, which is readily and economically produced as well as readily and safely controlled.

What is claimed is:

1. A process for polymerizing vinyl monomers which comprises subjecting a two-component system comprising a mixture of an inert liquid diluent and said vinyl monomer, in which the diluent has a polarity differing from that of the vinyl monomer, to pulsed electromagnetic radiation in the radio-frequency to microwave range, said electromagnetic radiation having a potential capable of causing dielectric heating, said potential being employed for a duty cycle of less than one percent to thereby avoid thermal activation.

2. A process for polymerizing vinyl monomers which comprises subjecting a dispersion of a non-solvent for the vinyl monomer and the vinyl monomer to pulsed electromagnetic radiation in the radio-frequency to microwave range, said electromagnetic radiation having a potential capable of causing dielectric heating, said potential being employed for a duty cycle of less than one percent to thereby avoid thermal activation.

3. The process of claim 2 wherein the vinyl monomer is dispersed in the non-solvent.

4. The process of claim 2 wherein the vinyl monomer is a liquid when irradiated.

5. A process for polymerizing vinyl monomers which comprises subjecting an aqueous dispersion of said vinyl monomer in liquid form to pulsed electromagnetic radiation having a frequency of 5 to 1,000 mc./sec. and a potential of at least 100 volts/cm., said pulsed radiation having a duty cycle of less than one percent.

6. The process of claim 5 wherein the vinyl monomer is styrene.

7. The process of claim 5 wherein the vinyl monomer is an acrylate ester.

8. The process of claim 5 wherein the vinyl monomer is in the form of a stable emulsion.

9. A process of polymerizing a vinyl monomer which comprises subjecting an aqueous solution of a water-soluble vinyl monomer to pulsed electromagnetic radiation having a frequency of 5 to 1,000 mc./sec. and a potential of at least 100 volts/cm. said pulsed radiation having a duty cycle of less than one percent.

10. The process of claim 9 wherein the vinyl monomer is acrylic acid.

11. The process of claim 9 wherein the vinyl monomer is methacrylic acid.

References Cited

UNITED STATES PATENTS

| | | | |
|---|---|---|---|
| 2,089,966 | 8/1937 | Kassner | 204—157.1 |
| 2,966,469 | 12/1960 | Smythe et al. | 204—165 |
| 3,209,056 | 9/1965 | Jacobs | 264—45 |

OTHER REFERENCES

Schildknecht: Vinyl & Related Polymers, John Wiley & Sons, 1952, pp. 17–18.

Bovey et al.: Emulsion Polymerization, Interscience Publishers, 1955, p. 167.

Martin: Use of Radiation To Promote Chemical Reactions, Chem. & Eng. News, vol. 33, No. 14, Apr. 4, 1955, pp. 1424–1428.

SAMUEL H. BLECH, *Primary Examiner.*

RICHARD B. TURER, *Assistant Examiner.*

U.S. Cl. X.R.

204—165, 168